Nov. 11, 1969  A. R. TYRRELL  3,478,235
TUBULAR COMBUSTION CHAMBER FOR AN MHD GENERATOR
Filed Aug. 7, 1967  5 Sheets-Sheet 2

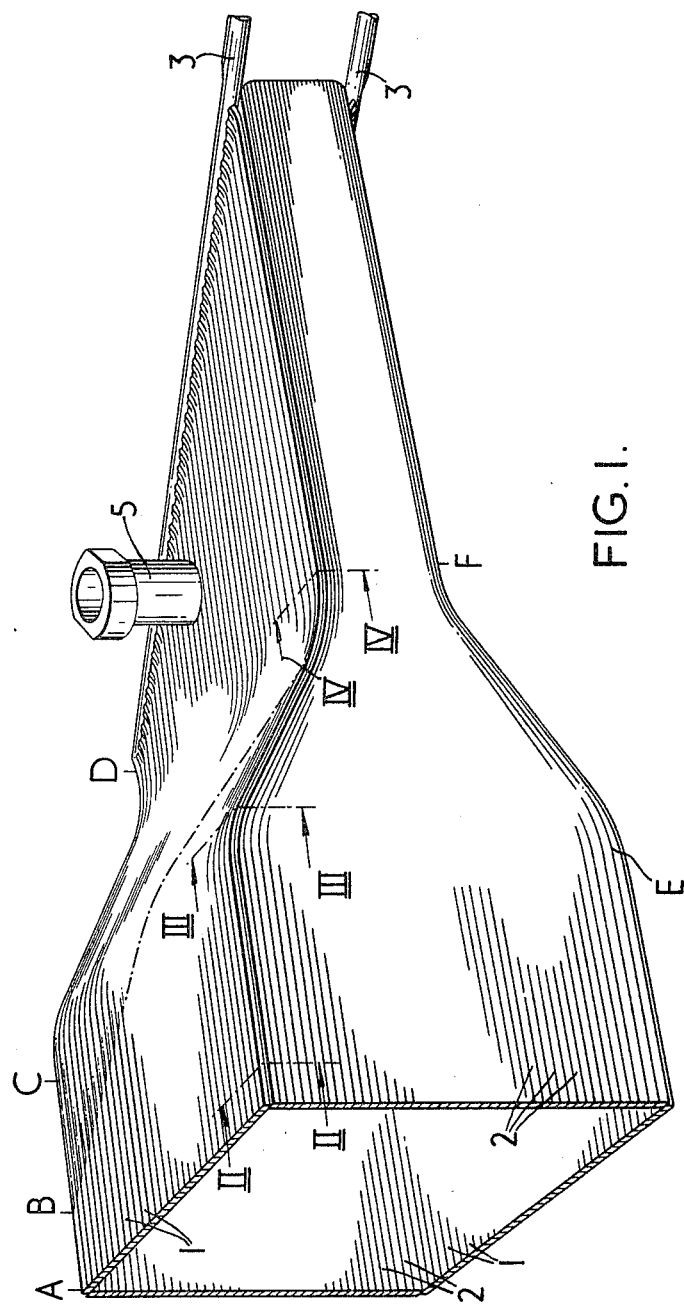

INVENTOR:-
ALBERT RALPH TYRRELL

Nov. 11, 1969  A. R. TYRRELL  3,478,235
TUBULAR COMBUSTION CHAMBER FOR AN MHD GENERATOR
Filed Aug. 7, 1967  5 Sheets-Sheet 4

INVENTOR:-
ALBERT RALPH TYRRELL

United States Patent Office 3,478,235
Patented Nov. 11, 1969

3,478,235
TUBULAR COMBUSTION CHAMBER FOR AN MHD GENERATOR
Albert Ralph Tyrrell, 6, The Hiron, Coventry, Warwickshire, England
Filed Aug. 7, 1967, Ser. No. 658,686
Claims priority, application Great Britain, Aug. 6, 1966, 35,294/66
Int. Cl. H02k 45/00; G21d 7/02
U.S. Cl. 310—11                            10 Claims

ABSTRACT OF THE DISCLOSURE

A tubular combustion chamber, particularly for a magnetohydrodynamic electrical generator, constructed from a plurality of flat-sided tubes extending longitudinally of the chamber and sealingly secured together side-by-side throughout their lengths. The combustion chamber has an upstream end perpendicular to the longitudinal axis of the chamber and a downstream end oblique to said longitudinal axis and the tubes are shaped to define the longitudinal profile of the combustion chamber, the cross-sectional shape of the flow path of the combustion chamber throughout its length and also to have cross-sectional shapes and flow areas differing along the lengths thereof to produce substantially the same pressure at the outlet ends of all the tubes of coolant passed therethrough.

---

The invention relates to a tubular combustion chamber of the kind constructed from a plurality of flat-sided tubes extending longitudinally of the chamber and sealingly secured together side-by-side through their lengths.

The present invention is particularly concerned with a tubular combustion chamber of the foregoing kind to be used to supply hot gas to a magnetohydrodynamic electrical generator (referred to hereinafter as a "MHD" generator), the combustion chamber being cooled by passing a coolant (for example water) through the tubes defining the combustion chamber between header passages at each end thereof.

The MHD generator with which the combustion chamber provided by this invention is intended to be used includes a generating duct of which the upstream end is oblique to its longitudinal axis. It is proposed to arrange the downstream end of the combustion chamber in direct communication with the upstream end of the generating duct and therefore the inclination of the downstream end of the combustion chamber is determined by the inclination required at the upstream end of the generating duct. As a result of the oblique downstream end of the combustion chamber and of the change in the cross-sectional shape of the combustion chamber, the tubes defining the combustion chamber are of unequal lengths. An object of the invention is to provide such a combustion chamber that, although the tubes thereof are of unequal length, the cooling effected is substantially the same for all the tubes.

In accordance with the invention, a tubular combustion chamber constructed from a plurality of flat-sided tubes extending longitudinally of the chamber and sealingly secured together side-by-side throughout their lengths has an upstream end perpendicular to the longitudinal axis of the chamber and a downstream end oblique to said longitudinal axis, the tubes being shaped to define the longitudinal profile of the combustion chamber so as together to define the cross-sectional shape of the flow path of the combustion chamber throughout its length and also having cross-sectional shapes and flow areas differing along the lengths thereof to produce substantially the same pressure at the outlet ends of all the tubes of coolant passed therethrough.

Conveniently, where the combustion chamber is to be used for supplying hot gas to an MHD generator, the combustion chamber has its flow path at the oblique downstream end of rectangular cross-section, and its flow path at the upstream end of rectangular (including "square") cross-section of greater height than that at the downstream end. The flow path through the combustion chamber may be of substantially constant width throughout its length.

By way of example, one construction of combustion chamber for a MHD generator, of the foregoing kind and having an oblique downstream end will now be described with reference to the accompanying drawings, in which:

FIGURE 1 is a diagrammatic perspective view of the combustion chamber;

Figure 5:
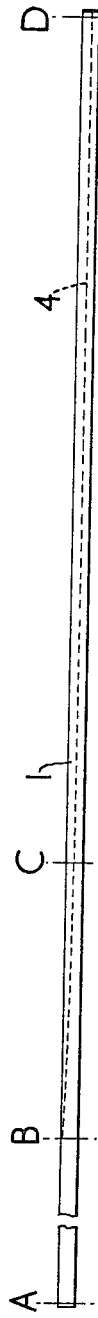
FIGURE 5 is a side elevation of part of a typical tube used for forming the top and bottom of the combustion chamber and shown before it has been bent to the required longitudinal profile.

Referring to FIGURE 1, the combustion chamber is of tubular form and has a square upstream end and a rectangular downstream end. The upstream end of the combustion chamber is perpendicular to its longitudinal axis and the downstream end is inclined, in plan view, at an angle of 45° to the longitudinal axis. The transition from the square upstream end to the oblique rectangular downstream end is produced by decreasing the height of the combustion chamber while maintaining the width thereof substantially constant. The combustion chamber is formed from a plurality of flat-sided tubes 1, 2 which are bent to the shape required to define the longitudinal profile of the combustion chamber and are secured together along abutting sides throughout their lengths by welding, brazing or a like process, thereby to form the fluid-tight walls of the combustion chamber. The top and bottom walls are formed by tubes 1, part of a typical tube 1 being shown, before bending to the required profile, in FIGURE 5. The side walls of the combustion chamber are formed from tubes 2, part of a tube 2 being shown, before bending to the required profile, in FIGURE 10.

The upstream and downstream ends of all the tubes 1 and 2 communicate with respective header manifolds by which a coolant fluid can be passed through the tubes in parallel. The downstream header manifold 6 and a deflector pipe 3, associated therewith, are described hereinafter with reference to FIGURES 13 to 16.

Figure 9:
FIGURES 6 to 9 are cross-sectional views through the tube shown in FIGURE 5 at the positions A, B, C and D respectively.
Figure 8:
Figure 10:
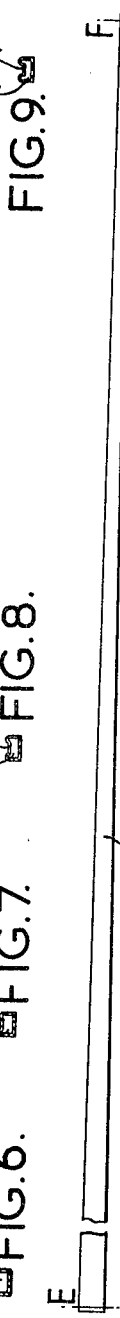
FIGURE 10 is a side elevation of part of a tube used for forming the sides of the combustion chamber and shown before it has been bent to the required longitudinal profile.
Figure 7:
Figure 6:
Figures 11, 12:
FIGURES 11 and 12 are cross-sectional views of the tube shown in FIGURE 10 at two positions E and F respectively.
Figure 17:
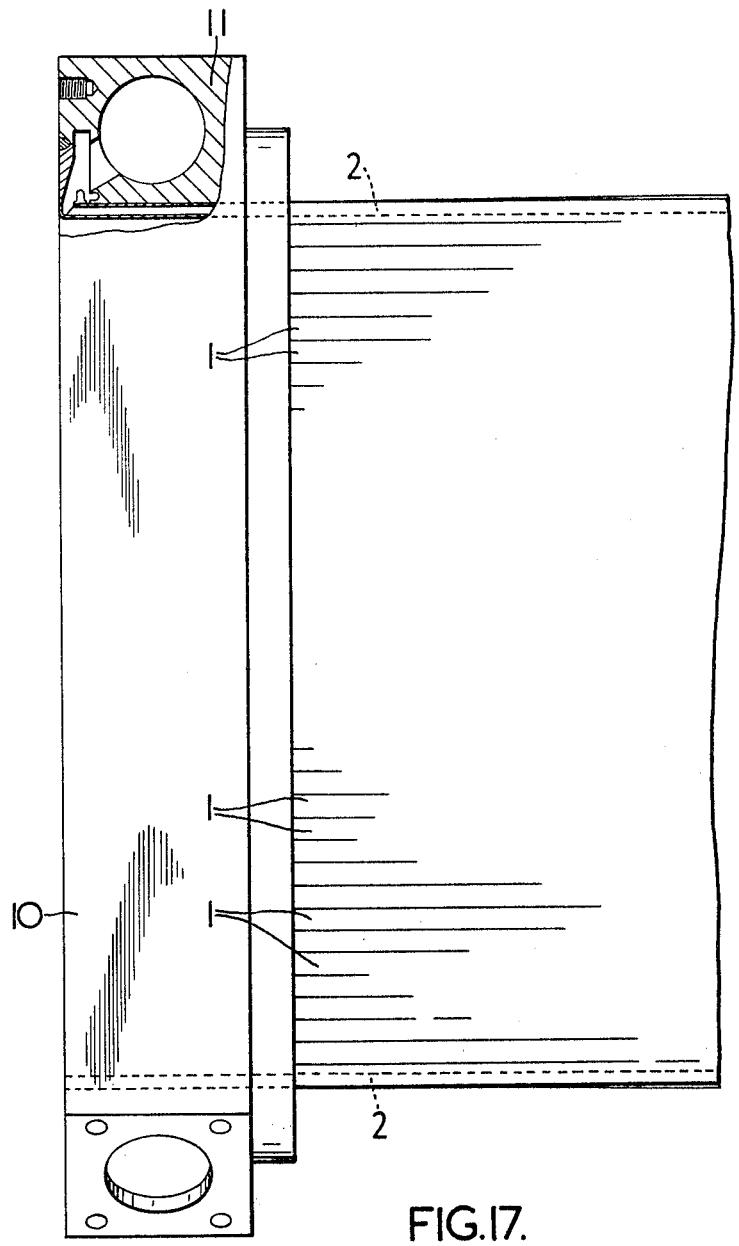
FIGURE 17 is a plan view of the upstream end of the combustion chamber and also shows an upstream end coolant header manifold, partly in section.

It is a feature of the present invention that the pressure of the coolant at the downstream end of each of the tubes 1 and 2 shall be substantially the same. Therefore the cross-sectional area of each tube is changed in the length thereof to produce the required pressure drop through the tube and also to accommodate the change in shape of the combustion chamber. The reduction in height between the upstream and downstream ends of the combustion chamber is accommodated by a gradual tapering of the tubes 2 in an intermediate region between non-tapered upstream and downstream end parts thereof, i.e., between positions E and F in FIGURES 1 and 10. As the pressure drop through each tube 2 forming a side wall of the combustion chamber is to be substantially the same and also substantially the same as that through each tube 1, the width of the flow path through each tube 2 is gradually increased along the tapered portion from the upstream to the downstream end thereof. The cross-sectional shape of a tube 2 of the near side wall of the combustion chamber upstream of the position E therein is shown in FIGURE 11 and the cross-sectional shape downstream of the position F is shown in FIGURE 12. Each tube 2 has parallel top and bottom sides upstream of the position E and downstream of the position F. Due to the oblique downstream end face of the chamber, the tubes 2 of the far side wall of the combustion chamber are shorter than the tubes of the near side wall by making the parallel downstream parts of the tubes 2 on the far side shorter. The required pressure at the downstream ends of the tubes 1 and 2 is produced by supplying the tubes 2 of the near side wall and all the tubes 1 through a common inlet header manifold 10 (shown in FIGURE 17) and by supplying the tubes 2 of the far side wall through a separate inlet header manifold 11 (shown in FIGURE 17), to which is supplied a coolant at a lower pressure than that supplied to the other inlet manifold. The tube 2 at a position mid-way between the top and bottom of each side wall of the combustion chamber is left straight (as shown in FIGURE 10); but the tubes 2 above and below the centre tube in each side wall are bent in such a way that the gradually changing cross-section of the tube in the tapered portion thereof remains substantially unaffected by the bending operation and that the flat top and bottom faces of each tube 2 will abut the adjacent top and bottom faces of the immediately adjacent tubes 2 along the whole lengths thereof. The outermost top and bottom tubes 2 of each side wall abut the adjacent laterally outer tube 1 along the whole length thereof and define the required profile of the top and bottom walls of the combustion chamber. The tubes 1 forming the top and bottom walls of the combustion chamber are not reduced in width as the side walls of the combustion chamber are parallel throughout its length. As the downstream end face of the combustion chamber is oblique, the height of the flow passage through each tube 1 is gradually reduced by forming a depression 4 in the upper face of each tube 1, thereby to ensure that the pressure drop produced in each tube 1, and hence the coolant pressure at the downstream end thereof, will be substantially equal, despite the different lengths of the tubes 1, and will be substantially the same as the pressure drop in each tube 2 of the near side wall. The position in the tube 1, adjacent the far side wall of the duct, where the depression 4 commences, is indicated at B in FIGURES 1 and 5, the cross-section at this position being shown in FIGURE 7. The oblique chain line from point B in FIGURE 1 indicates that this position changes in the progressively longer tubes 1 as they approach the near side wall of the combustion chamber. The cross-section at a position C, indicated in FIGURES 1 and 5, intermediate the positions B and D at the downstream end is shown in FIGURE 8. The position C also changes in the progressively longer tubes 1. The cross-section at the downstream ends D of all the tubes 1 is shown in FIGURE 9.

Figure 4:
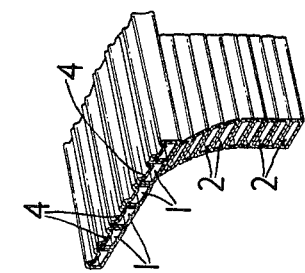
FIGURE 4 is a view similar to FIGURES 2 and 3 on the lines IV—IV in FIGURE 1.
Figure 3:
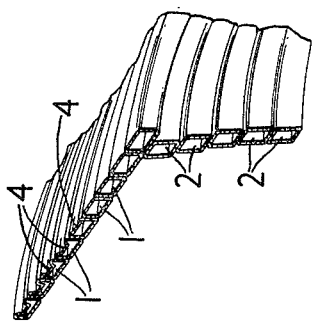
FIGURE 3 is a view similar to FIGURE 2 on the lines III—III in FIGURE 1.
Figure 2:
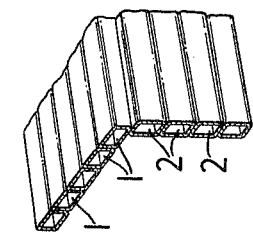
FIGURE 2 is a perspective and sectional view to a larger scale of a corner of the combustion chamber on the lines II—II in FIGURE 1.

The transition between the cross-section of the combustion chamber at the upstream and downstream ends thereof is also effected by stepping several of the tubes 2 at the top and bottom of each side wall inwardly thereof, as will be seen from a comparison of FIGURES 3 and 4 with FIGURE 2. This enables sharp corners at the square upstream end of the combustion chamber as shown in FIGURE 2 to be blended smoothly with radiused corners at the rectangular downstream end, the latter being required to register with radiused corners of the generating duct.

Figure 13:
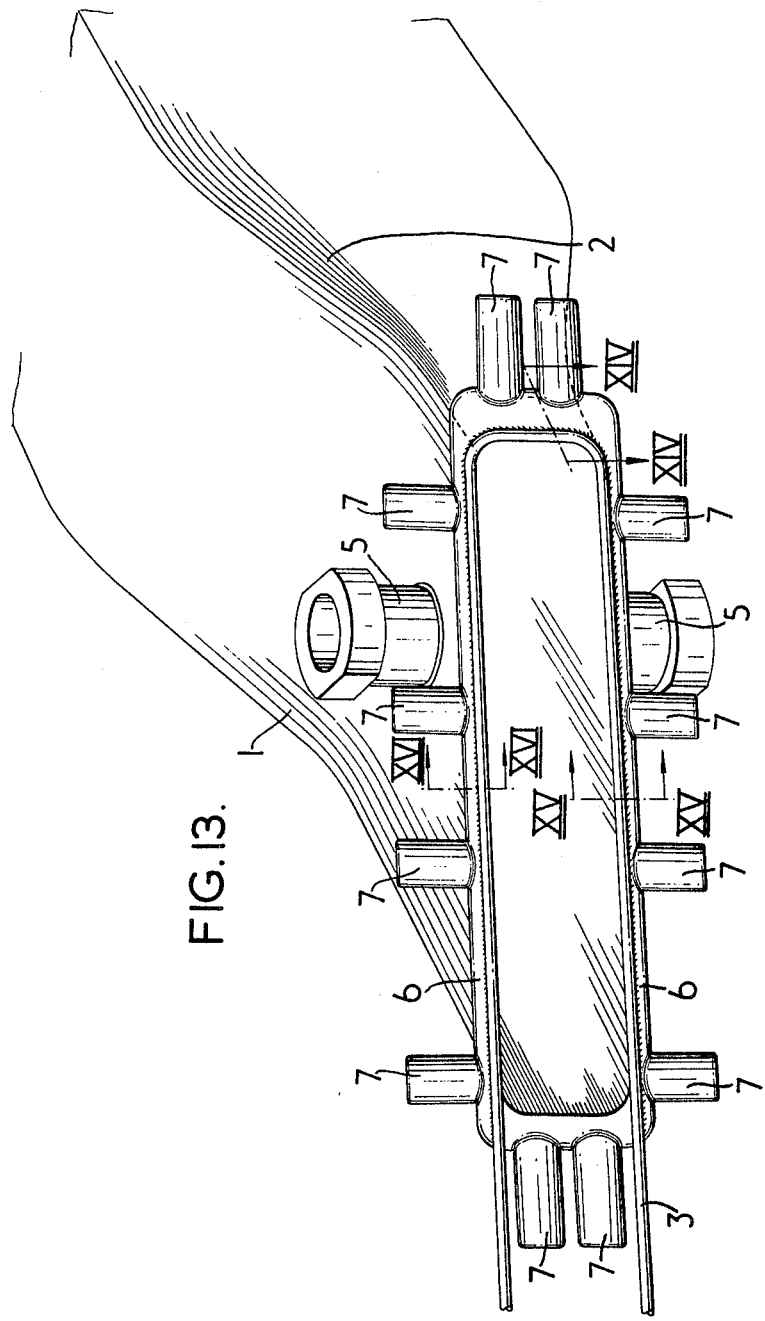
FIGURE 13 is a perspective view showing the downstream end of the combustion chamber.

It may be necessary to provide in a wall of the combustion chamber a tubular member for introducing or extracting a fluid or through which a probe can be inserted into the combustion chamber or for an inspection port. One of these tubes is indicated by 5 in FIGURE 1 and a pair of them are shown in FIGURE 13. The flow of coolant through tubes 1 (or 2 where the tubes 5 are provided in a side wall) in the vicinity of the tubes 5 must not be interrupted thereby, nor must the pressure drop through the relevant tubes 1 or 2 be affected. Accordingly the tubes 5 are each bounded by hollow walls communicating with adjacent tubes 1 or 2. A tube similar to a tube 5 is described in copending application Ser. No. 658,688, filed Aug. 7, 1967 (British application No. 35,293/66).

The assembly of tubes 1 and 2 is bounded by an outer frame of stainless steel members (not shown) forming a casing for the combustion chamber. This casing is intended to carry the structural and bursting loads of the combustion chamber, the tubes 1 and 2 therefore need only be capable of withstanding the coolant pressure and the pressure within the combustion chamber and loading due to thermal expansion.

Figure 14:
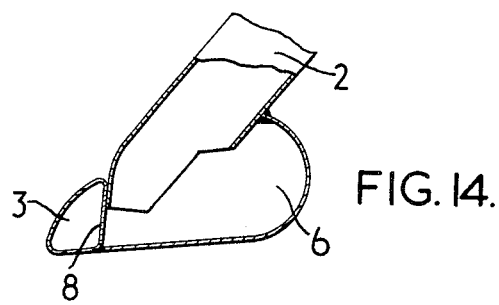
FIGURES 14, 15 and 16 are respectively part-sections on the lines XIV—XIV; XV—XV, and XVI—XVI in FIG. 13.
Figure 15:
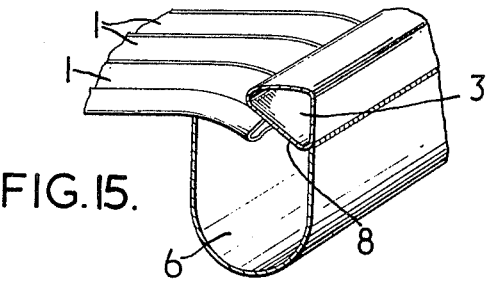
Figure 16:
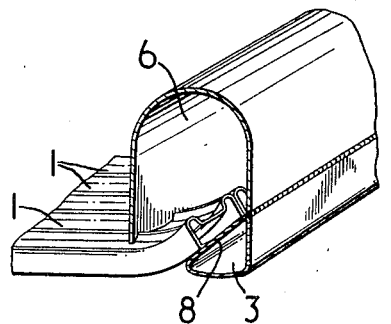

The outlet header manifold 6 at the downstream end of the combustion chamber is shown in FIGURES 13 to 16. It will be seen from FIGURES 14 to 16 that the downstream ends of the tubes 1 and 2 are curved outwardly of the combustion chamber into the common outlet header manifold 6. The purpose of so curving the ends of the tubes 1 and 2 is to reduce turbulence in the coolant flow into the manifold 6 which could lead to local overheating due to inefficient and irregular cooling. The manifold 6 has stub outlet tubes 7 leading therefrom to convey the coolant from the manifold. (The outlet tubes 7 are shown only in FIGURE 13.) At the portion of the manifold 6 in alignment with the aforesaid far side wall of the combustion chamber, i.e., the shorter side wall, seen at the right-hand side in FIGURE 13, the direction of flow of coolant has to be turned through a greater angle into the manifold 6, than at the position of the manifold 6 in alignment with the aforesaid near side wall, i.e., the longer side wall, seen at the left-hand side of FIGURE 13. Where the inclination of the downstream end of the combustion chamber is 45° with respect to the longitudinal axis thereof, as in this example, the direction of flow of coolant through the tubes 2 has to be turned through 135° at the said far side wall, as shown in FIGURE 14, and only through 45° at the said near side wall while the flows from the top and bottom tubes 1 into the manifold 6 have to be turned through 90°, as shown in FIGURES 15 and 16. The turning of the coolant into the manifold by the outwardly curved ends of the tubes 1 and 2 is aided by the tube 3 which extends around the manifold 6 in alignment with the top, bottom and said far side walls of the combustion chamber, a wall 8 of the tube 3 forming a downstream continuation of the outwardly curved ends of the tubes 1 and 2 of said walls. In FIGURE 14 it will be seen that the tube 3 completes the corner of the manifold 6 and so substantially reduces the angle through which the coolant has to flow into the manifold from the said shorter side wall and thereby avoids what would otherwise be a pocket of stagnant coolant, which would result in the formation of turbulence with consequent overheating at this corner. The tube 3 also extends along the downstream ends of the top and bottom walls of the combustion chamber, as seen in FIGURES 15 and 16 and performs a similar function there. A stream of coolant, (e.g., water), separate from that flowing through the tubes 1 and 2 and the manifold 6 is circulated through the tube 3.

The oblique and rectangular downstream end of the combustion chamber is necessary in the example illustrated because the combustion chamber is required to be connected to a MHD generator duct having an oblique and rectangular upstream end; but in other applications, the downstream end of the combustion chamber may be of other shape. In this example, by making the cross-section of the upstream end of the combustion chamber square, only a comparatively simple transition between the upstream and downstream ends is required. However in other applications, the cross-sectional shape at any position in the length of the combustion chamber may be of shape other than square or rectangular.

If required, a transitional duct portion constructed similarly to the combustion chamber shown in FIGURE 1, may be provided between the combustion chamber and the MHD generator.

What I claim as my invention and desire to secure by Letters Patent of the United States is:

1. A tubular combustion chamber constructed from a plurality of flat-sided tubes extending longitudinally of the chamber and sealingly secured together side-by-side throughout their lengths, wherein the improvement comprises said combustion chamber having an upstream end perpendicular to the longitudinal axis of the chamber and a downstream end oblique to said longitudinal axis and said tubes being shaped to define the longitudinal profile of the combustion chamber and the cross-sectional shape of the flow path of the combustion chamber throughout its length and also having cross-sectional shapes and flow areas differing along the lengths thereof, thereby to produce substantially the same pressure at the outlet ends of all the tubes of coolant passed therethrough.

2. A tubular combustion chamber as claimed in claim 1 for supplying hot gas to a magnetohydrodynamic electrical generator (referred to herein as a MHD generator), the combustion chamber having its flow path at the oblique downstream end of rectangular cross-section and its flow path at the upstream end of rectangular cross-section of greater height than that at the downstream end.

3. A tubular combustion chamber as claimed in claim 2 in which the width of the flow path through the combustion chamber is substantially constant throughout the length thereof.

4. A tubular combustion chamber as claimed in claim 3 in which the reduction in height between its upstream and downstream ends is effected by at least a portion of each of the tubes defining the side walls of the combustion chamber being of tapered shape by decreasing the height and increasing the width in the downstream direction thereof.

5. A tubular combustion chamber as claimed in claim 4 in which the tubes defining each of the side walls thereof are arranged one on top of another to form a flat wall except that several tubes adjacent the top and bottom edges of the wall are stepped inwardly of said wall downstream of the upstream end of the combustion chamber by increasing amounts in the downstream direction of the combustion chamber, the cross-section of the combustion chamber thereby being changed from a sharp-cornered to a concave rounded-cornered rectangular shape between the upstream and downstream ends thereof.

6. A tubular combustion chamber as claimed in claim 3 in which each of the tubes defining the top and bottom walls thereof is of substantially constant width throughout its length, thereby to maintain the width of the combustion chamber substantially constant throughout its length, and a portion of each of said tubes is of reduced height, the length of the portion of reduced height of each tube being such that the coolant pressures at the downstream ends of all the tubes of said walls are substantially the same.

7. A tubular combustion chamber as claimed in claim 6 including a common coolant inlet header manifold communicating with the upstream ends of all the tubes defining the top and bottom walls and the longer side wall, a separate coolant inlet header manifold communicating with the upstream ends of all the tubes defining the shorter side wall of the combustion chamber and a common outlet header manifold at the downstream ends of all the tubes of all four walls of the combustion chamber.

8. A tubular combustion chamber as claimed in claim 7 including a deflector member forming a continuation of the inner surface of at least the shorter side wall of the combustion chamber beyond the outlet ends of the tubes defining said wall, whereby the direction of flow of coolant from said tubes is turned into said common outlet header manifold.

9. A tubular combustion chamber as claimed in claim 8 in which said deflector member also forms a continuation of the top and bottom walls of the combustion chamber.

10. A tubular combustion chamber as claimed in claim 9 in which the deflector member is formed by a wall of a tubular compartment extending at least partially around said common outlet header manifold, said tubular compartment having inlet and outlet means, whereby a coolant, other than the coolant flowing through the tubes defining the walls of the combustion chamber, is circulated through said tubular compartment independently of the flow of coolant from the tubes through said common outlet header manifold.

References Cited

UNITED STATES PATENTS

| | | | |
|---|---|---|---|
| 2,244,451 | 6/1941 | Falla | 122—235 |
| 3,309,546 | 3/1967 | Boll | 310—11 |
| 3,374,368 | 3/1968 | Swift-Hook et al. | 310—11 |

DAVID X. SLINEY, Primary Examiner

U.S. Cl. X.R.

122—235